United States Patent
Nunnink

(10) Patent No.: US 7,549,582 B1
(45) Date of Patent: Jun. 23, 2009

(54) METHOD AND APPARATUS FOR ADJUSTING FOCUS IN A SYMBOLOGY READER

(75) Inventor: Laurens Nunnink, Simpelveld (NL)

(73) Assignee: Cognex Technology and Investment Corporation, Mt. View, CA (US)

( * ) Notice: Subject to any disclaimer, the term of this patent is extended or adjusted under 35 U.S.C. 154(b) by 14 days.

(21) Appl. No.: 11/744,310

(22) Filed: May 4, 2007

Related U.S. Application Data

(63) Continuation of application No. 11/420,830, filed on May 30, 2006, now abandoned.

(51) Int. Cl.
*G06K 7/10* (2006.01)

(52) U.S. Cl. ............ 235/462.22; 235/435; 235/462.01; 235/462.41

(58) Field of Classification Search .................. 235/454, 235/462.2, 462.22, 435, 462.01, 462.14, 235/462.41; 359/440, 441
See application file for complete search history.

(56) References Cited

U.S. PATENT DOCUMENTS

| | | | | |
|---|---|---|---|---|
| 4,072,396 A * | 2/1978 | Ross | .......................... | 359/425 |
| 4,160,590 A * | 7/1979 | Reynard | ..................... | 396/103 |
| 4,478,491 A * | 10/1984 | Kawai | ......................... | 359/825 |
| 4,490,018 A * | 12/1984 | Yokotsuka | .................. | 359/702 |
| 4,494,828 A * | 1/1985 | Masumoto et al. | .......... | 359/690 |
| 4,591,253 A | 5/1986 | Hecker et al. | | |
| 5,247,152 A | 9/1993 | Swartz et al. | | |
| 5,349,172 A | 9/1994 | Roustaei | | |
| 5,587,843 A * | 12/1996 | Chen | .......................... | 359/700 |
| 5,773,810 A | 6/1998 | Hussey et al. | | |
| 5,825,559 A * | 10/1998 | Johnson et al. | ............. | 359/819 |
| 6,073,851 A | 6/2000 | Olmstead et al. | | |
| 6,179,208 B1 | 1/2001 | Feng | | |
| 6,340,114 B1 | 1/2002 | Correa et al. | | |
| 6,431,452 B2 | 8/2002 | Feng | | |
| 6,449,430 B1 * | 9/2002 | Tasaka et al. | ................... | 396/6 |
| 6,832,729 B1 * | 12/2004 | Perry et al. | ............ | 235/472.01 |
| 6,845,915 B2 | 1/2005 | Krichever et al. | | |
| 7,025,271 B2 | 4/2006 | Dvorkis et al. | | |
| 7,073,715 B2 | 7/2006 | Patel et al. | | |
| 7,222,793 B2 | 5/2007 | Patel et al. | | |
| 2002/0191309 A1 * | 12/2002 | Taylor et al. | ................. | 359/819 |
| 2006/0034596 A1 * | 2/2006 | Yamazaki et al. | ............. | 396/79 |
| 2006/0055819 A1 * | 3/2006 | Pokrovsky et al. | .......... | 348/373 |

* cited by examiner

*Primary Examiner*—Daniel A Hess
*Assistant Examiner*—Paultep Savusdiphol

(57) ABSTRACT

A symbology reader has an adjustable focus mechanism that permits a plurality of focus settings by rotating a lens assembly threadedly engaged in the symbology reader housing. A focus adjustment collar having a plurality of key slots engage in a key when the cover to the symbology reader is attached. The rotation of the adjustment collar on the lens assembly is limited to not more than a single revolution through the use of cooperative stops that are fixed relation to the lens and housing respectively.

17 Claims, 3 Drawing Sheets

METHOD AND APPARATUS FOR ADJUSTING FOCUS IN A SYMBOLOGY READER

This patent application is a continuation of U.S. patent application Ser. No. 11/420,830 which is titled "Method and Apparatus for Adjusting Focus in a Symbology Reader" which was filed on May 30, 2006 now abandoned.

BACKGROUND OF THE INVENTION

1. Field of the Invention

This invention relates to a method and apparatus for adjusting the focus setting of an optical imaging system that acquires an image of a symbol having an encoded character string for the purposes of decoding the symbol and outputting the decoded character string.

2. Description of the Related Art

Encoded symbols and bar codes are typically applied to printed labels, or directly marked on objects for identification and part tracking purposes. The encoded symbol or bar code may contain a lot number or serial number of the part or component, which can be read and decoded using a symbol or bar code reader at various times in an industrial process.

One-dimensional bar codes are often scanned and decoded using a conventional laser-scanner bar code reader. A reader that uses an imaging system is necessary to read and decode more complex symbols, such as two-dimensional symbols or bar codes.

Two-dimensional symbols are used for most direct part marking applications because such symbols can encode a sufficient number of characters while maintaining a relatively compact size. Error correction schemes are typically included in most two-dimensional symbologies, to improve the readability of the symbol. The two-dimensional symbols are often marked directly on the part or component using various methods, depending upon the material composition, part application, and environmental conditions. Common methods include dot peening, laser, and electro-chemical etch.

Symbols marked directly on a part or component are often difficult to read in comparison to symbols printed on labels. An image of a dot-peened, or etched mark often exhibits very low contrast using illumination or image formation systems of most image-based symbology readers. When a symbol is printed on an adhesive label, and applied to a part or component, or the part packaging, a typical image-based symbology reader can provide sufficient read rate. Industry trends, however, suggest that applications of direct part marking are nevertheless increasing.

In a hand-held imaging system reader, the user can improve the read rate by varying or adjusting the distance of the reader to the part bearing the symbol, to effectively change or alter the focal properties of the optical imaging system. A fixed-mount reader that is used to scan objects passing on a conveyor or material handling system must be configured during an initial setup stage. To ensure an optimal read rate of a fixed-mount reader, the imaging system must provide an appropriately focused image, which can be attained by altering the relative position of the reader to the part on the conveyor or material handling system, or by adjusting the focus setting of the optical system of the reader.

An image-based reader has a field of view that increases proportionally in size to the distance of the object from the reader. A fixed-focus reader limits the useful range of the reader. Adjustable focus readers can permit high resolution image acquisition with a small field of view for dense symbols like the data matrix, or low resolution acquisition with a large field of view for large bar codes.

Image-based readers typically employ the use of built-in illumination to provide variable and controlled illumination. Low angle dark field illumination requires a working range where the symbols are placed in close proximity to the reader. Bright field on-axis illumination is typically optimized with an increased relative distance to the reader. A reader having an adjustable focus provides a plurality of working ranges that can be operated with various modes of illumination.

In most low-cost optical readers, the focus setting will be fixed, and the focus setting is attained by adjusting the distance from the object bearing the symbol to the imaging system. To improve the flexibility of imaging systems used to read symbols or bar codes in a variety of working ranges, for example, to provide adequate clearance between the reader and the object due to conveyor and material handling equipment, an adjustable focus capability is desired in image-based readers.

BRIEF SUMMARY OF THE INVENTION

The invention relates to a method and apparatus for adjusting a focus setting in a symbology reader. An apparatus according to the invention comprises an image-based symbology reader that uses an image sensor to acquire an image of a symbol, so that the image can be processed or decoded to determine the encoded string of the symbol. The image sensor is contained in a housing, with a lens assembly is threadedly engaged in the housing and optically aligned with the image sensor. A pair of rotation stops are provided to limit rotation of the lens to provide a range of focus settings. One of the rotation stops is in a fixed position relative to the housing, while the other rotation stop is in a fixed position relative to the lens. The lens assembly has a plurality of key slots, and one of the plurality of key slots is aligned and engaged with a key that is attached to the cover or housing. During operation with the key engaged in the selected key slot, the reader will operate with a focus setting associated with the selected key slot.

In an embodiment of the invention, the key slots and one of the rotation stops are on an adjustment collar that is attached to the lens assembly. One of the key slots engages with the key in the cover when the focus setting is at an extreme of the range of focus settings, i.e., when the lens assembly is rotated to a rotational position that is limited by the pair of rotation stop. Another of the plurality of key slots is associated with the focus setting at another extreme of the range of focus settings.

In a method of adjusting the focus of a symbology reader according the present invention, the cover is removed from the housing to expose the lens having a plurality of key slots. By turning the lens to a rotational position within the range of focus settings that is limited by the pair of rotation stops, a desired focus setting is selected. The cover is replaced while engaging the key of the cover into the key slot associated with the desired focus setting so that the reader can operate with the desired focus setting.

Other aspects of the invention, in addition to those discussed above, will be apparent to those skilled in the art from the description of the embodiments that follow. In the descrip-

DETAILED DESCRIPTION OF THE INVENTION

Figure 1:
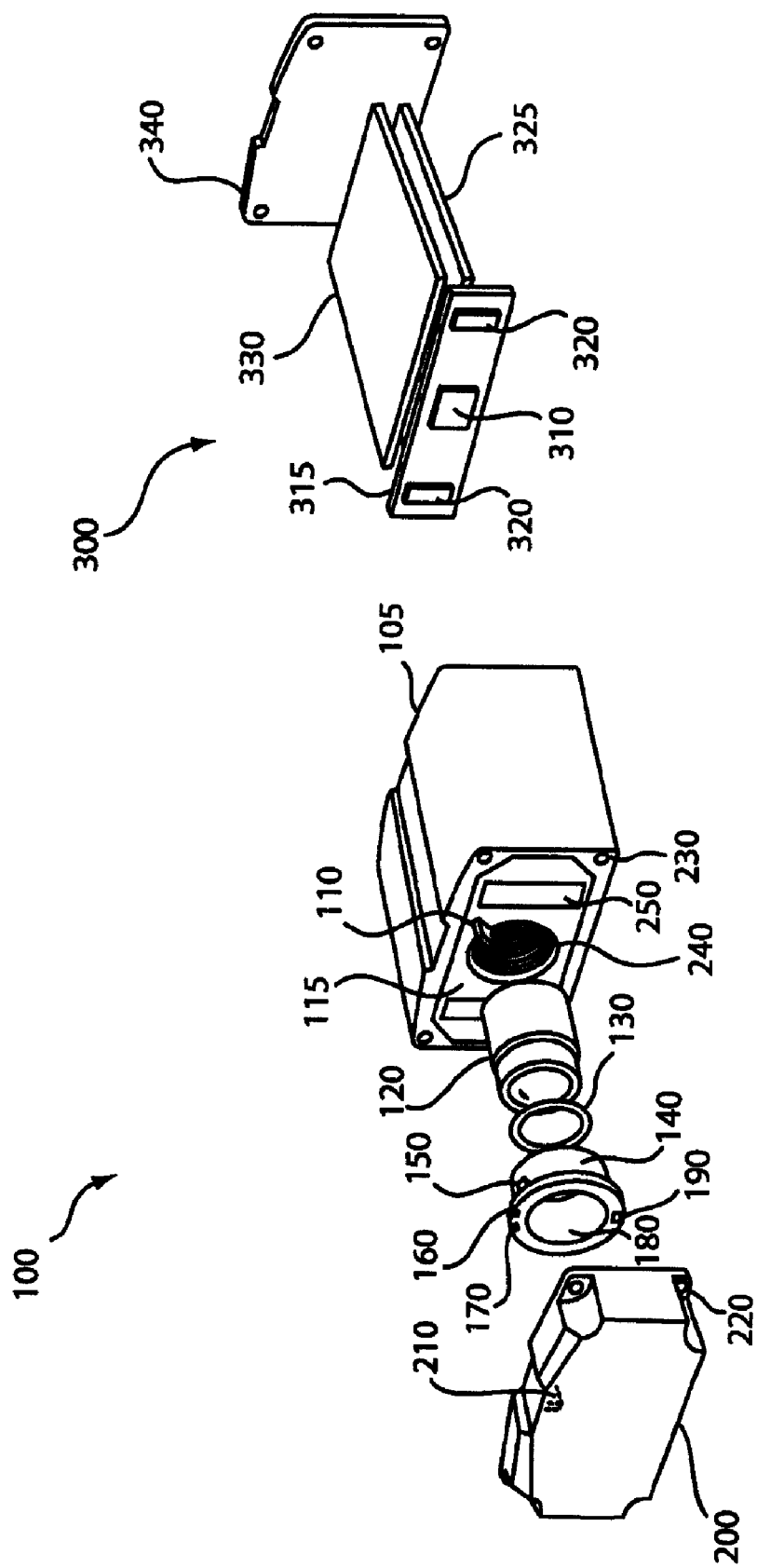
FIG. 1 is an exploded perspective view of a fixed mount imaging system for reading and decoding symbols or bar codes for practicing the present invention.

Referring to FIG. 1, a fixed mount imaging system 100 includes an extruded aluminum central housing body 105. A molded-plastic support 115 provides support for illumination lenses 250, and has an opening that reveals the threaded receptacle 240 that receives a threaded lens assembly 120.

The extruded aluminum central housing body 105 contains an imaging subsystem 300 for acquiring and decoding an image of a symbol or bar code. The imaging subsystem includes a CMOS imager 310, that is preferably a Micron MT9V022 sensor with a global shutter, for detecting an image projected onto the imager 310 by the threaded barrel lens 120. The imager 310 is mounted on an imaging board 315, with LED illuminators 320 that are optically aligned with the illumination lenses 250, and the imaging board 315 is attached to the housing body 105 internally through fasteners (not shown). In alternative embodiments, a CCD image sensor or image sensing arrays can be used for the imager 310.

A processor board 325 and an I/O board 330 are shown as a pair of parallel boards that are interconnected with conventional circuit board connectors, and are electrically connected to the imager board through an interface cable or connector (not shown). The imaging subsystem 300 is inserted into the rear of the housing 105, and is captured and protected by the end cover 340. The end cover 340 may have a port (not shown) for entry or connection of an interface cable, or it may enclose an internal antenna for reception of wireless communications for communication with a host system, or networked to a client display on a remote system. The interface cable may be Ethernet, USB, Firewire, or another suitable data network, including wireless protocols. The imaging subsystem 300 may include one or more LED indicators that can be viewed through the end cover 340, or through viewing ports machined in the housing 105, that can display status information of the reader, or status information relating to the success of the current or previous read/decode attempt during run time.

Although the imaging system 100 shown is intended for fixed mounting, the description herein is equally applicable to a hand held unit, with the addition of a suitable handle, and/or a trigger.

Referring still to FIG. 1, the threaded lends assembly 120 is threadedly engaged into the threaded receptacle 240. The threaded lens assembly 120 in the illustrative embodiment is a standard M12 lens, with an outer diameter of 12 mm with a thread pitch of 0.5 mm. When initially assembled, the lens 120 is threaded into the receptacle 240 to a predetermined depth—e.g., the focal position that will provide an adequate level of sharpness to successfully decode an image of a symbol at a first working position. When the lens 120 is at the closest working range position, the adjustment collar 140 that forms an opening 180 is attached to the lens assembly 120 with an adhesive ring 130, or press-fit to the lends assembly 120. In this first working position, the rotation limiting stop 150 on the adjustment collar 140 is positioned adjacent to the housing stop 110, so that once the collar 140 is attached to the lens 120, the total rotational adjustment of the focus is limited to not more than approximately one revolution.

A transparent cover 200 is attached to the housing 105 with fasteners (not shown) cooperative with cover holes 220 and housing receptacles 230. Appropriate fasteners can be screws, or snap-locking fasteners that could facilitate removal and replacement of the cover 200 without the need for tools. The cover 200 has a key 210 that engages in one of a first slot 160, a second slot 170, or a third slot 190, all in the adjustment collar 140, depending on the angular orientation of the collar 140 and lens 120. Accordingly, in the illustrative embodiment, one of three focus settings can be attained, with the cover 200 secured to the housing 105. One skilled in the art will appreciate that the key can be attached to the housing as well as the cover to selectively engage in a desired key slot during configuration.

Figure 2:
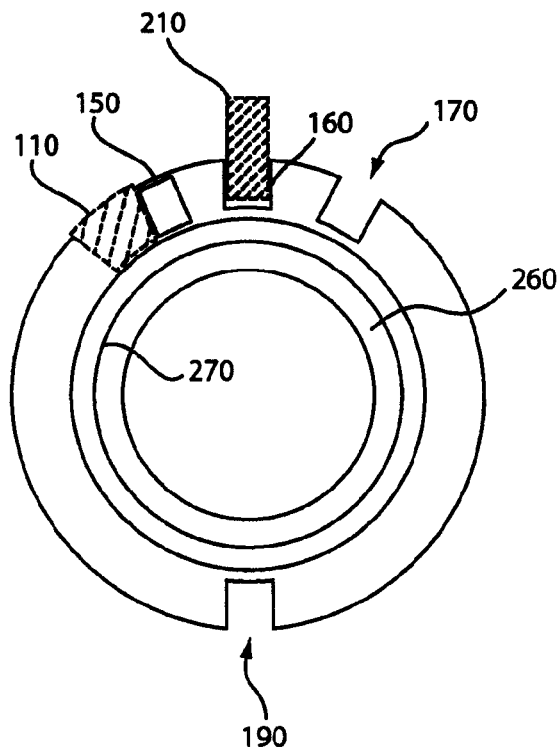
FIG. 2 depicts the focus adjustment collar of the illustrative embodiment of the present invention in a first focus setting.

FIG. 2 depicts the adjustment collar 140 in a first focus setting position, as viewed from the perspective of the lens assembly 120 upon which it is attached. The inner cylindrical surface 270 fits over the lens assembly 120 in a press-fit or with the adhesive ring 130 mating to the end of the lens and the inner mating surface 260. The collar 140 is rotationally aligned so that the first: slot 160 is in the position that will engage with the key 210, with the rotation limiting stop 150 adjacent to the housing stop 110 (shown in phantom) thereby limiting the rotation of the collar in the counterclockwise motion as shown. To set the imaging system 100 to this first focus setting, the user will rotate the collar 140 fully clockwise so that the rotation limiting stop 150 makes contact with the housing stop 110, and then attaching the cover 200 while engaging the key 210 into the first slot 160. Once the cover 200 is secured in place, the focus setting will be maintained at the first focus setting.

Figure 3:
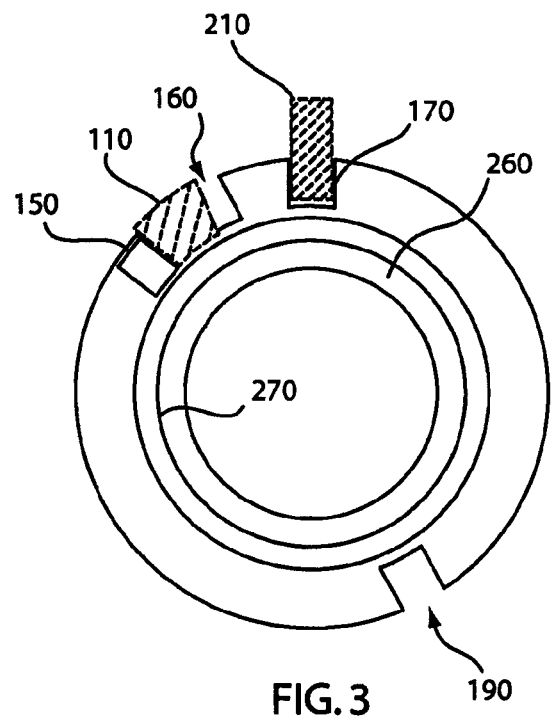
FIG. 3 depicts the focus adjustment collar of the illustrative embodiment of the present invention in a second focus setting.

FIG. 3 depicts the adjustment collar 140 in a second focus setting position, as viewed from the perspective of the lens assembly 120 upon which it is attached. The inner cylindrical surface 270 fits over the lens assembly 120 in a press-fit or with the adhesive ring 130 mating to the end of the lens and the inner mating surface 260. The collar 140 is rotationally aligned so that the second slot 170 is in the position that will engage with the key 210, with the rotation limiting stop 150 adjacent to the housing stop 110 (shown in phantom) thereby limiting the rotation of the collar in the clockwise motion as shown. To set the imaging system 100 to this second focus setting, the user will rotate the collar 140 fully counterclockwise so that the rotation limiting stop 150 makes contact with the housing stop 110, and then attaching the cover 200 while engaging the key 210 into the second slot 160. Once the cover 200 is secured in place, the focus setting will be maintained at the second focus setting.

Figure 4:
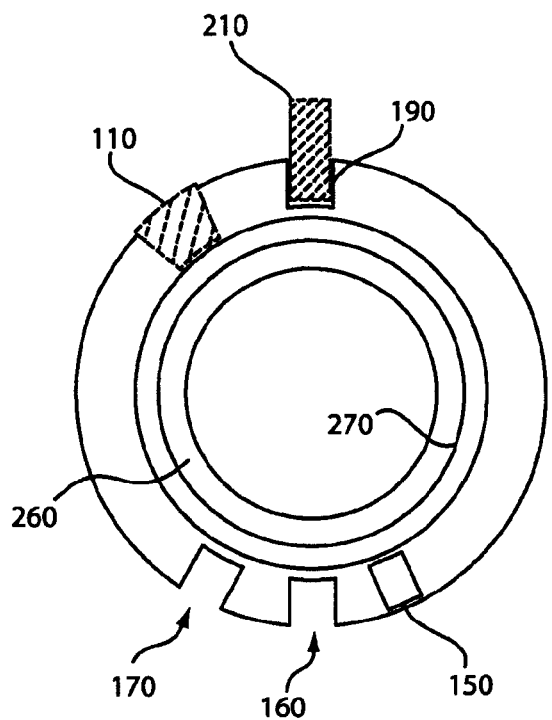
FIG. 4 depicts the focus adjustment collar of the illustrative embodiment of the present invention in a third focus setting.

FIG. 4 depicts the adjustment collar 140 in a third focus setting position, as viewed from the perspective of the lens assembly 120 upon which it is attached. The inner cylindrical surface 270 fits over the lens assembly 120 in a press-fit or with the adhesive ring 130 mating to the end of the lens and the inner mating surface 260. The collar 140 is rotationally aligned so that the third slot 190 is in the position that will engage with the key 210. In this third focus setting, which is approximately half-way between the first and the second focus setting, the rotation limiting stop 150 is not adjacent to the housing stop 110 (shown in phantom), but instead, approximately halfway between contact with the housing stop 110 in the clockwise and counterclockwise positions. To set the imaging system 100 to this third focus setting, the user will rotate the collar 140 into this third focus setting, and then attaching the cover 200 while engaging the key 210 into the first slot 160. Once the cover 200 is secured in place, the focus setting will be maintained at the third focus setting.

In the illustrative embodiment according to FIG. 1, the lens assembly 120 having a standard M12 thread pitch and a 6 mm focal length, will result in a working range of 40 mm in the first focus position, and a working range of 105 mm in the second focus position. The third focus position will provide a working range of 65 mm. By selecting one of the three focus settings during configuration of the system, it is not necessary to attach a monitor to visually assess the image quality.

Figure 5:
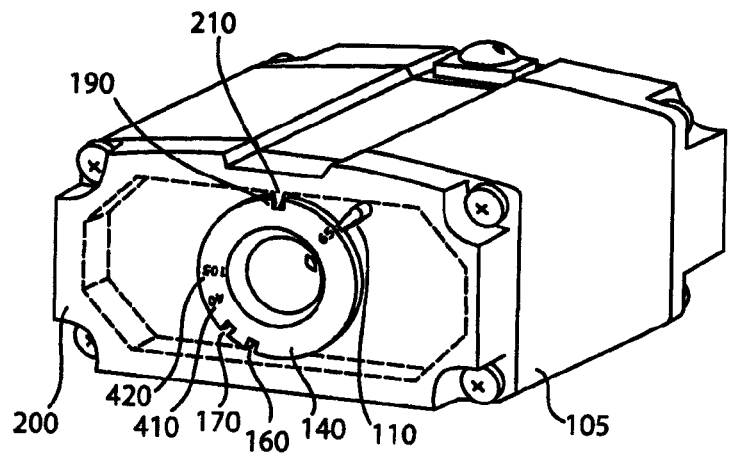
FIG. 5 depicts an alternate embodiment of the invention in a first focus setting.

To provide visual aid in selecting one of the first, second, or third focus settings, indicating features can be added to the adjustment collar 140, as shown in FIG. 5. A first focal length indicator 410 is marked on the face of the adjustment collar 140 at a location that is aligned with the rotation stop 110 when the collar is rotated to align the key 210 with the first slot 160, to identify the first focus setting. A second focal length indicator 420 is marked on the face of the adjustment collar 140 at a location aligned with the rotation stop 110 when the collar is rotated to align the key 210 with the second slot 170 to indicate the position of the second focus setting. As depicted in FIG. 5, a third focal length indicator 430 is marked on the face of the adjustment collar 140 at a location that is aligned with the rotation stop 110 when the collar is rotated to align the key 210 with the third slot 190 on the adjustment collar 140 to indicate the position of the third focus setting. The features indicating the focus setting can be visible through the clear cover 200 when attached to the housing 105 so that the user can determine the focus setting without removing the cover.

Figure 6:
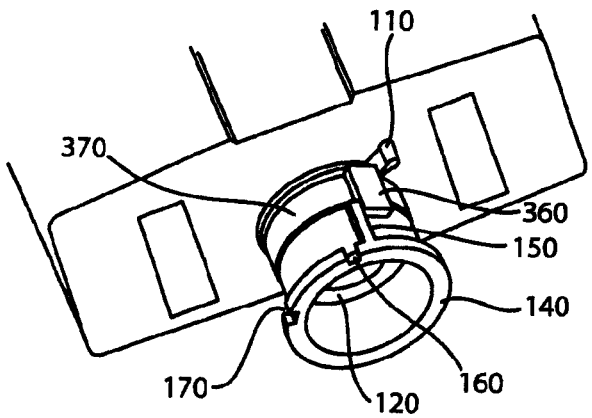
FIG. 6 depicts the alternate embodiment of the invention in a second focus setting.

An alternate embodiment is depicted in FIG. 6 that permits an expanded focus range between the first focus setting and the second focus setting. In this embodiment, the adjustment collar 140 is press-fit or adhered to the lens assembly 120 with an auxiliary spacer 370 that freely rotates around the lens assembly. In a first focus position, the rotation limiting stop on the adjustment collar 140 is rotated against the auxiliary stop 360 that is rotated against the rotation stop 110. In this first focus position, the first slot 160 will align with the key 210 (not shown) when the cover 200 (not shown) is attached.

Figure 7:
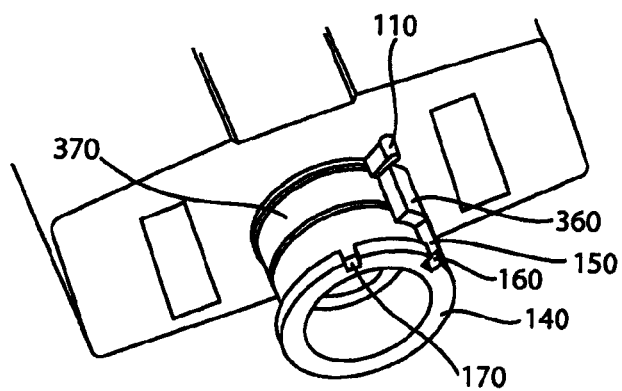
FIG. 7 depicts the alternate embodiment of the invention in a second focus setting.

The alternate embodiment is further depicted in FIG. 7, in a second focus position. Here, the adjustment collar 140 is rotated nearly two revolutions counter-clockwise so that the rotation limiting stop 150 is against the auxiliary stop 360 by rotating the auxiliary spacer 370 rotated nearly a revolution, so that the auxiliary stop 360 is against the rotation stop 110. In this second focus position, the second slot 170 is aligned with the key 210 (not shown) when the cover 200 (not shown) is attached.

Other modifications and implementations will occur to those skilled in the art without departing from the spirit and the scope of the invention as claimed. Accordingly, the above description is not intended to limit the invention except as indicated in the following claims.

I claim:

1. A symbology reader comprising:
   a housing having an image sensor;
   a lens assembly threadedly engaged to the housing, and optically aligned with the image sensor, the lens assembly including a lens;
   a first rotation stop in a fixed position relative to the housing;
   a second rotation stop in a fixed position relative to the lens, and cooperative with the first rotation stop to limit rotation of the lens to provide a range of focus settings;
   a component forming a plurality of key slots in a fixed position relative to the lens; and
   a key that engages in one of the plurality of key slots upon rotation of the lens to select a desired focus setting in the range of focus setting.

2. The symbology reader according to claim 1 wherein one of the plurality of key slots will result in the selection of a desired focus setting at an extreme of the range of focus settings.

3. The symbology reader according to claim 2 wherein another of the plurality of key slots will result in the selection of a desired focus setting at another extreme of the range of focus settings.

4. The symbology reader according to claim 1 wherein one of the plurality of key slots will result in the selection of a desired focus setting at a substantially central position in the range of focus settings.

5. The symbology reader according to claim 1 wherein the second rotation stop is cooperative with the first rotation stop to limit rotation of the lens to not more than one revolution.

6. The symbology reader according to claim 1 further comprising a third rotation stop that freely rotates about the lens assembly, and cooperative with the first rotation stop and the second rotation stop to limit rotation of the lens to not more than two revolutions.

7. The symbology reader according to claim 1 further comprising a removable transparent cover, the key positioned on the cover to engage in one of the plurality of key slots when attached to the housing.

8. The symbology reader according to claim 1 wherein the component comprises an adjustment collar fixedly attached to the lens assembly, the adjustment collar bearing the plurality of key slots and the second rotation stop.

9. The symbology reader according to claim 8 wherein the adjustment collar is fixedly attached to the lens assembly using an adhesive.

10. The symbology reader according to claim 8 wherein the adjustment collar is press-fit to the lens assembly.

11. The symbology reader according to claim 1 further comprising a color indicator adjacent to one of the plurality of key slots and visible through the cover when the cover is attached to the housing.

12. The symbology reader according to claim 1 wherein the range of focus settings is a working range substantially between 40 mm and 105 mm.

13. The reader of claim 1 wherein each of the key slots locks the lens to the housing when the key is received therein.

14. The reader of claim 1 wherein the component that forms the plurality of key slots is part of the lens assembly.

15. A method of adjusting the focus setting of an image-based symbology reader of the type that comprises a lens, an imaging sensor, and a housing, the lens threadedly engaged in the housing wherein rotation of the lens results in a change in a focus setting, the method comprising:

removing a cover to expose the lens and a component forming a plurality of key slots in fixed positions relative to the lens;

turning the lens to a rotational position within a range of focus settings limited by a pair of rotation stops, one of the pair of rotation stops fixed relative to the housing, the other of the pair of rotation stops fixed relative to the lens, the pair of rotation stops cooperative to limit rotation of the lens to be less than a full revolution; and replacing the cover while engaging a key into one of the plurality of key slots.

16. The method of claim 14 wherein each of the key slots locks the lens to the housing when the key is received therein.

17. The method of claim 15 wherein the component that forms the plurality of key slots is part of the lens assembly.

* * * * *